UNITED STATES PATENT OFFICE.

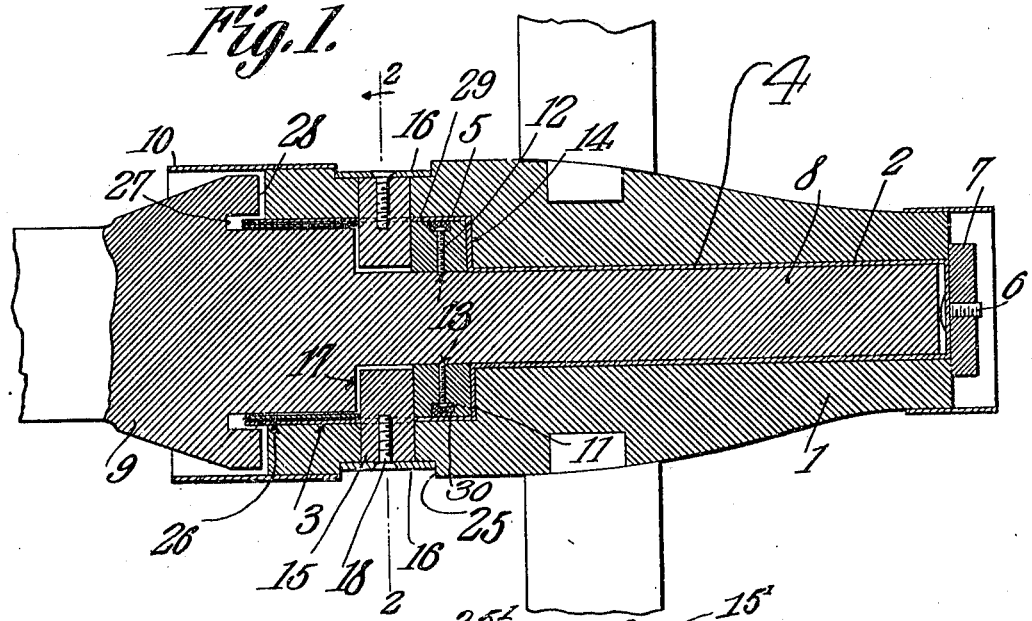
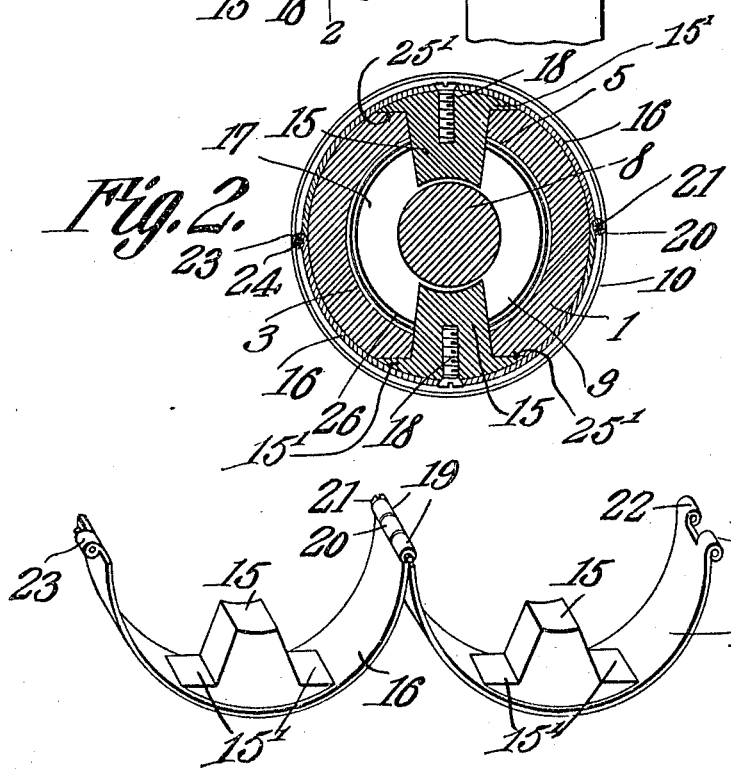
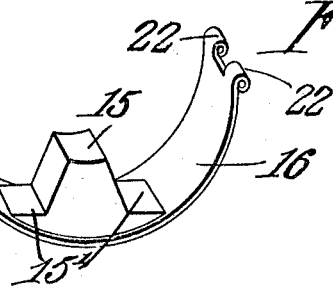

WILLIAM W. CORK, OF NAPER, NEBRASKA.

WHEEL-HUB.

956,041.  Specification of Letters Patent.  Patented Apr. 26, 1910.

Application filed February 1, 1909. Serial No. 475,417.

*To all whom it may concern:*

Be it known that I, WILLIAM W. CORK, a citizen of the United States, residing at Naper, in the county of Boyd and State of Nebraska, have invented a new and useful Wheel-Hub, of which the following is a specification.

This invention relates generally to wheel hubs, and particularly to the novel form of axle-box and spindle therefor.

One object of the invention is, in a simple and thoroughly practical manner, so to secure the axle-box within the hub that while the assemblage of the parts shall be of the most stable character, yet their separation, when necessary, may readily be accomplished by a person possessing only ordinary mechanical ability, whereby the employment of a wheelwright or blacksmith for this purpose is rendered unnecessary, and the expense and loss of time which would otherwise be incurred are prevented.

A further object is to dispense with the use of the ordinary nut for holding the spindle and hub assembled and in lieu thereof to employ a novel form of hub locking means that may easily be detached from the parts without the use of any special form of tool for the purpose, or which may readily and cheaply be replaced when rendered useless as from wear or breakage.

A further object is in a simple manner to render the hub practically dust and grit proof.

With the above and other objects in view, as will appear as the nature of the invention is better understood, the same consists in the novel construction and combination of parts of a wheel hub, as will be hereinafter fully described and claimed.

In the accompanying drawings forming a part of this specification, and in which like characters of reference indicate corresponding parts:—Figure 1 is a vertical longitudinal sectional view through a hub equipped with the improvements of the present invention. Fig. 2 is a vertical transverse sectional view taken on the line 2—2, Fig. 1, and looking in the direction of the arrows thereon. Fig. 3 is a perspective detail view of the locking device for holding the spindle and hub assembled.

Referring to the drawings, 1 designates the hub which is provided with the usual spindle bore 2, the inner end of which is furnished with a relatively large counter-bore 3 to receive the spindle, hereinafter described. Arranged within the bore is the axle-box 4, the inner portion of which is formed with an enlargement 5 to fit within the counter-bore. The axle-box is, in this instance, held within the bore by providing the outer end of the former with a threaded extension 6 that is engaged by a nut 7 which is of sufficient diameter to bear against the outer end of the hub, and thus firmly hold the axle-box and hub assembled. As herein shown, the member 6 is a screw that is inserted through the outer wall of the axle-box; but it is to be understood that if preferred it may be an integral portion of the axle-box without departing from the spirit of the invention.

Arranged within the box is the spindle 8 which is provided with a rear enlargement 9 to fit partly within the counter-bore 3 and within a sand band 10 of the usual or any preferred construction. Disposed upon the spindle, adjacent to its inner end, is a collar 11 which is held in position thereon by a plurality of screws or bolts 12, countersunk within the periphery of the collar, and engaging at their inner ends with seats 13 formed in the spindle. This collar is designed to work against the end wall 14 of the enlarged portion of the box, which latter engages with the end wall of the counter-bore, and by this arrangement, a rigid structure is secured.

The means for locking the spindle within the hub consists of a pair of dogs or detents 15 that are secured to two semi-bands 16 and project through openings provided in the enlarged portion 5 of the box and extend nearly to the spindle, and work between the inner face of the collar 11 and the shoulder 17 formed by the enlarged portion 9 of the spindle. As shown in Fig. 2, the dogs are of tapered form and their inner ends are curved on an arc corresponding to the circumference of the spindle and are held assembled with the semi-bands by screws or bolts 18, of which one, in this instance, is shown as combined with each of the dogs, although, if preferred, two or more may be employed. The dogs or detents 15 are provided at their large ends with oppositely extending wings 15′ having flat faces designed to bear upon shoulders 25′ formed at the outer ends of the openings in which the dogs or detents are seated. These wings and shoulders coöperate to limit the movement of the dogs or detents in the direction of the spindle and prevent said detents from contacting with the spindle and from becoming too firmly wedged within the openings.

As a means for assembling the two semi-bands for swinging movement relatively to each other one of the bands is provided with two knuckles 19, and the other band with a single knuckle 20, and through the three knuckles passes a pintle or pin 21, in the manner common to the ordinary hinge. To hold the band, formed by the two members 16, assembled with the hub, the outer end of one is provided with two knuckles 22, and the like end of the other with a single knuckle 23, and through these three knuckles passes an ordinary cotter pin 24, as shown in Fig. 2. The hub is shown as provided with a circumferential groove 25 to receive the band, but this is not essential and may be omitted if preferred. The means herein shown for assembling the two semi-bands is one that may be adopted and will be found efficient for the purpose, but it is to be understood that this object may be accomplished in various other ways, and as these will be obvious to anyone of mechanical ability, detailed illustration of any modified illustration is omitted.

In order, additionally, to guard against the entrance of dust or grit to the axle and axle-box, a supplemental dust guard 26 may be secured within the counter-bore of the hub and this, together with the inner end of the axle-box, extends into an annular channel 27 formed in the shoulder 28 of the enlarged portion 9 of the spindle.

The advantages of the construction above set forth are that when it is desired to remove the hub from the spindle, as when the same is to be lubricated, it will only be necessary to withdraw the cotter pin 24 and detach the band, whereupon the hub may readily be slipped from the spindle.

When it is desired to remove the axle-box from the hub, the latter is detached from the spindle in the manner above described and the nut 7 unscrewed, thus leaving the axle-box free to be driven out of the hub. This may easily be accomplished, as there are no wedges employed in holding the axle-box in place. Should either the dogs or the collar become damaged, or worn to such an extent as to be rendered useless, these parts may readily and quickly be supplied by any person of ordinary mechanical ability.

As will be obvious, the collar may be adjusted longitudinally on the spindle to compensate for any wear, either of it or of the dogs, so that all end-shake may at any time be taken up, and the effective life of the parts be thus materially prolonged.

In order further to accentuate the dust-precluding properties of the hub, the collar 11 is provided with a peripheral groove 29 in which is placed any suitable form of packing 30, which will contact with the inner wall of the enlarged portion of the axle-box, as shown in Fig. 1, and thus secure the object sought. This channel also serves as a counter-sink to throw the heads of the screws 12 within the periphery of the collar, and thus prevent any wear of the axle-box.

Of course, all of the parts of the hub constituting the present invention will be made in standard sizes and may thus easily be obtained and applied to position when necessary.

What is claimed is:—

The combination with a wheel hub having a counterbored opening therein, there being radially extending apertures within the hub and opening into the counterbore and opposed shoulders adjacent each opening, of a spindle projecting into the hub, there being an enlargement upon the spindle and forming a shoulder within the counterbore, a collar secured to the spindle and within the counterbore, a band surrounding and detachably secured to the hub, and tapered dogs secured to the band and removably mounted within the openings and normally projecting between the shoulder and collar, each dog having oppositely extending wings normally seated upon the shoulders adjacent the openings.

In testimony that I claim the foregoing as my own, I have hereto affixed my signature in the presence of two witnesses.

WILLIAM W. CORK.

Witnesses:
H. F. SOAT,
GEO. HOTALING.